(12) United States Patent
Nelson et al.

(10) Patent No.: US 6,209,061 B1
(45) Date of Patent: *Mar. 27, 2001

(54) INTEGRATED HIERARCHICAL MEMORY OVERLAY HAVING INVARIANT ADDRESS SPACE SPAN THAT INACTIVATES A SAME ADDRESS SPACE SPAN IN MAIN MEMORY

(75) Inventors: Marvin D. Nelson; Randy J. Matthews, both of Boise, ID (US)

(73) Assignee: Hewlett-Packard Co., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,969

(22) Filed: Mar. 2, 1998

(51) Int. Cl.[7] .................................................. G06F 12/08
(52) U.S. Cl. ............................................................ 711/132
(58) Field of Search ................................ 711/118, 129, 711/132

(56) References Cited

U.S. PATENT DOCUMENTS

| | | | |
|---|---|---|---|
| 4,628,450 | 12/1986 | Sato et al. | 364/200 |
| 5,043,870 | 8/1991 | Ditzel et al. | 364/200 |
| 5,893,148 * | 4/1999 | Genduso et al. | 711/132 |
| 5,930,820 * | 7/1999 | Lynch | 711/132 |
| 5,953,741 * | 9/1999 | Evoy et al. | 711/132 |

FOREIGN PATENT DOCUMENTS

| | | |
|---|---|---|
| 0067345A2 | 12/1982 | (EP) . |
| 930465A | 9/1998 | (GB) . |

* cited by examiner

Primary Examiner—Kevin L. Ellis

(57) ABSTRACT

It has been determined that considerable data which is written to stacks is of the type that does not require long term retention (i.e., it is only required to be valid for the duration of a procedure or function which created it). Accordingly, when a stack is employed to handle such data (and other similar data), invalidation and writes to main memory that ordinarily accompany accesses of such data (when the stack is held in a cache memory) can be avoided. The invention therefore improves memory performance by providing an overlay memory, to which is assigned a set of main memory addresses that are utilized for stack operations. When data is either read or written from/to the overlay memory, there is no further communication "downstream" to either a cache memory or main memory. In other words, the overlay memory is used for short term storage and accesses to the overlay memory are invisible to other memory elements of the system. There is thus no need to invalidate any data and nor to write such data to main memory. As a result, substantially improved memory operations result.

9 Claims, 2 Drawing Sheets

INTEGRATED HIERARCHICAL MEMORY OVERLAY HAVING INVARIANT ADDRESS SPACE SPAN THAT INACTIVATES A SAME ADDRESS SPACE SPAN IN MAIN MEMORY

FIELD OF THE INVENTION

This invention relates to a method and apparatus for improving memory performance in a computer and, more particularly, to a method and apparatus for achieving more efficient processing performance through use of an overlay memory for storage of intermediate processing data.

BACKGROUND OF THE INVENTION

Manufacturers of microprocessors continue to improve their performance by increasing the clock speed of their components. In order to capitalize on these clock speed increases, the microprocessor must maintain an efficient operation of memory systems, including cache memories. Since the improvements in memory systems have not kept pace with improvements in microprocessor design, the penalties for cache misses have become a critical component in overall system design.

As is known to those skilled in the art, a cache memory is an area of buffer memory that is employed to store frequently used items and enables rapid accessibility thereto. A cache "hit" is when a particular item is found in the cache memory and a cache "miss" is when a particular item is not found in the cache memory and access must then be had to main memory to recover the required item. In the event of a cache miss, access to the main memory occurs via a relatively slow speed process which slows overall system operation. Further, when a write occurs to a cache line, the entire line is marked as "dirty", indicating an inconsistent state with the corresponding data in main memory. Thereafter, the entire cache line needs to be posted to main memory to remove the cache line's dirty state, a further time consuming action.

To improve the accessibility of certain processing variables, current operating systems allocate regions of memory, on a temporary basis, for storage of such variables. These temporarily allocated regions are termed "stacks". It has been determined that, with certain complex imaging applications, from 15% to 50% of external data memory accesses are made to such stack structures. Accordingly, memory performance can be improved if the operation of stack structures is optimized.

The prior art has attempted to enhance stack operation by providing small amounts of expensive, high speed/low latency memory where the stacks could be placed. This approach is relatively expensive and the designer needs to ensure that enough such high speed/low latency memory is available for system stack needs. If the system designer does not provide sufficient memory for stack purposes, late changes in the programs are required to compensate for the greater stack space need.

In general, designers are conservative in providing for stack space, in that such stack space is over-allocated so that it is never completely consumed. Thus, the designer is generally forced to provide an additional 10% of stack space over what is considered to be a worst case situation. Further, in such stack arrangements, it is often found that there is much activity near the base of the stack and little or no activity near the top of the stack.

As indicated above, when a write is made to a cache line, the associated cache memory controller marks the data as "dirty" in the accessed cache line. The data resident at that cache line is then posted to main memory, at some point in time, even if the relevant portion of the cache is associated with a stack. Since the portion of the cache memory associated with a stack receives frequent "hits", that portion of the cache requires frequent cache management actions, thus reducing the system's performance efficiency.

A further approach to improving stack memory operation is to split the stack into pieces, one piece that resides in high speed memory and another piece which exists in lower speed memory (e.g., main memory). This arrangement requires that the software/firmware that manages the system stack resources must check for the transition point between the different physical components of the logical stacks. Such a "stack sentinel" requires relatively small size code, but is executed hundreds of thousands of times for tasks of moderate difficulty. Thus, while this approach helps address the cost issues of providing high performance stack memory, it requires some performance degradation to manage the stack activity. Further, it requires some external access to main memory, resulting in a degree of delay in microprocessor operations.

Accordingly, it is an object of this invention to provide an improved method and apparatus for management of memory usage in a microprocessor.

SUMMARY OF THE INVENTION

It has been determined that considerable data which is written to stacks is of the type that does not require long term retention (i.e., it is only required to be valid for the duration of a procedure or function which created it). Accordingly, when a stack is employed to handle such data (and other similar data), invalidation and writes to main memory that ordinarily accompany accesses of such data (when the stack is held in a cache memory) can be avoided. The invention therefore improves memory performance by providing an overlay memory, to which is assigned a set of main memory addresses that are utilized for stack operations. When data is either read or written from/to the overlay memory, there is no further communication "downstream" to either a cache memory or main memory. In other words, the overlay memory is used for short term storage and accesses to the overlay memory are invisible to other memory elements of the system. There is thus no need to invalidate any data or to write such data to main memory. As a result, substantially improved memory operations result.

DETAILED DESCRIPTION OF THE INVENTION

Figure 1:
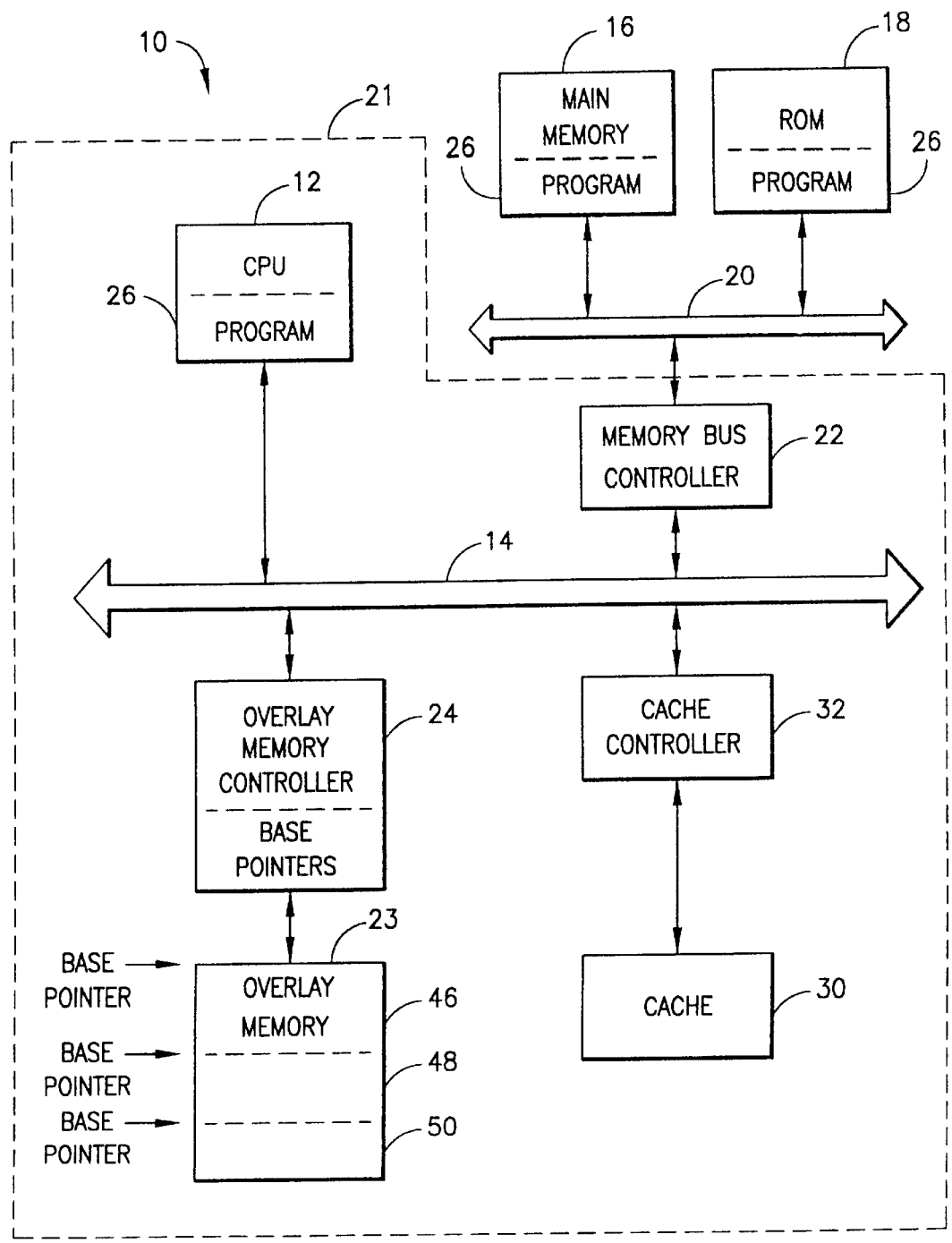
FIG. 1 is a block diagram of a data processing system particularly adapted to carrying out the invention.

Referring now to FIG. 1, a computer 10 includes a central processing unit (CPU) 12 that communicates with other elements via a high speed bus 14. A main memory 16 and read-only memory (ROM) 18 are coupled to a slower speed memory bus 20 via a memory bus controller 22. In turn, memory bus controller 22 communicates with the remainder of the elements of computer 10 via high speed bus 14. All of the elements within dotted box 21 are traditionally referred to as a processor. Accesses to main memory 16, via memory bus controller 22 and memory bus 20, characteristically, evidence delays and lower speeds of data transfer than those on high speed bus 14.

An overlay memory 23 is coupled via an overlay memory controller 24 to high speed bus 14. Overlay memory 23 is a relatively small, high-speed memory which provides storage for data and parameters that are temporarily required for a program 26 that is currently running on CPU 12. As will be apparent, overlay memory 23 can be segmented into a number of memory regions, with each region defined by a base pointer value that evidences a base address of a region of addresses and a length value. A record of each base pointer value is maintained in overlay controller 24. In essence, each base pointer value and an associated length value (of addresses which extend from the base pointer value) define a set of storage locations having addresses that are present in main memory 16 but are, for the time being, unused.

Accordingly, when program 26, during execution, accesses a memory address contained within one of the memory regions within overlay memory 23, overlay memory controller 24 responds to that address and its response action inhibits any propagation of that address to other elements of computer 10. Further, when data is written to overlay memory 23, no subsequent writing of that data occurs to any other memory region within computer 10. Thus, overlay memory 23 performs the function of a stand-alone, high speed memory that is principally utilized for temporarily required data and/or parameters.

By avoiding the reads and writes to main memory, there is a substantial reduction in memory bus 20 utilization, thereby freeing up resources to accomplish other work. This reduced bus use increases the ability to service requests requiring bus access and increases performance efficiency. Additionally, the CPU reduces the wait states required to read and write data associated with this high access region of memory, thus substantially increasing performance.

The invention also allows designers to provide a minimal amount of the more expensive high speed memory to cover only the most intensely used portions of the stack regions. There are no late project design delays associated with poor estimates of the size of the stack regions, since any arbitrary amount of overlay memory will provide a performance benefit. Additionally, there is no need for software or hardware to monitor the growth of the stack regions since at the point when the overlay memory is exhausted, the main memory automatically services the requests.

Computer 10 may also include a cache memory 30 which is coupled to high-speed bus 14 via cache controller 32. Cache memory 30 and its associated cache controller 32 operate in the classical manner and, to the extant required, may also be utilized to store temporarily required data for an executing program.

Figure 2:
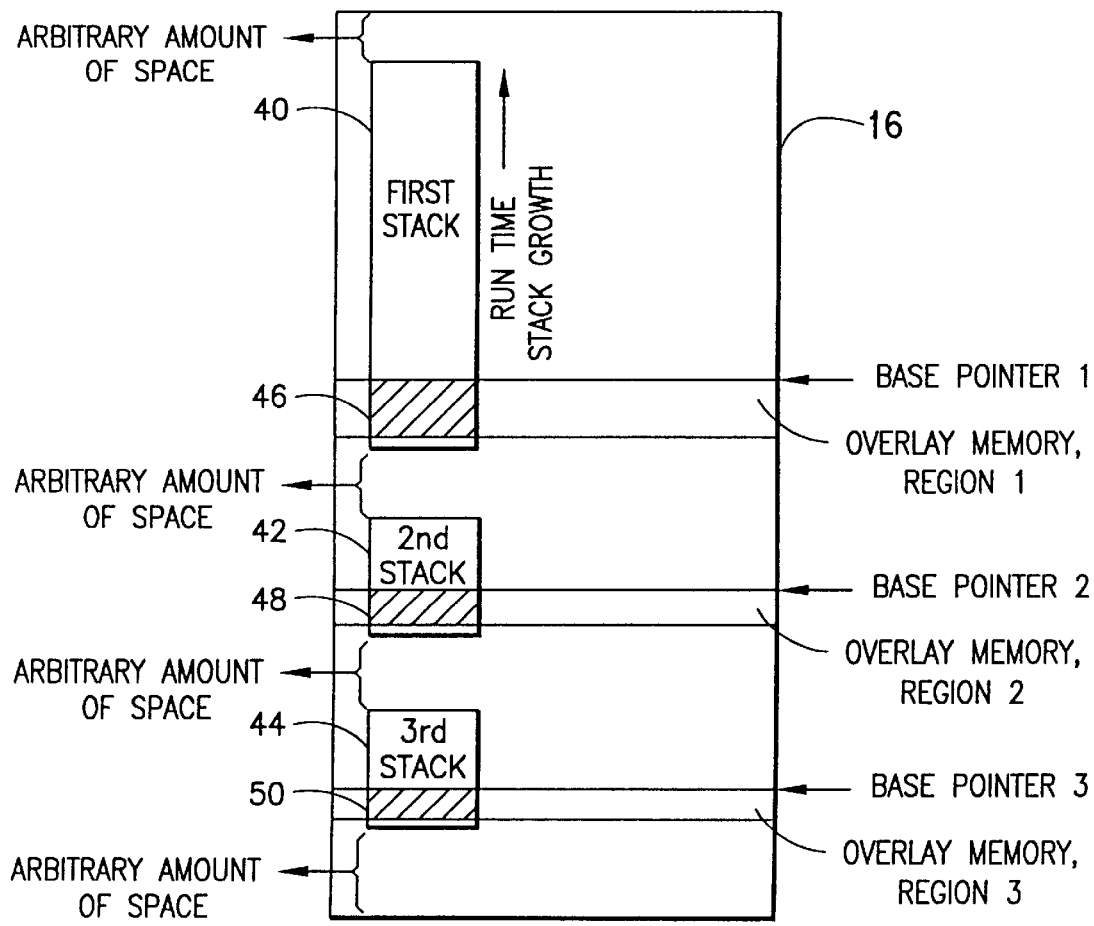
FIG. 2 is a schematic showing of a memory, wherein a portions thereof are allocated for use as a stack and further portions thereof are overlaid by address assignments to an overlay memory.

Referring to FIG. 2, a more detailed view of main memory 16 is illustrated, showing three regions thereof (i.e., 40, 42 and 44) which have been allocated for use as stack memory regions. It has been determined that from 15% to 50% of external data memory accesses made by an executing program, such as program 26, are made to the data assigned to stack memory regions. As above indicated, if the stack memory regions are maintained in main memory 16, the system is burdened with delay times inherent in reading data from main memory 16 and/or writing data to main memory 16.

If, by contrast, the stack regions are managed by a cache memory, the system is burdened by the requirements to maintain main memory 16 in synchronism with changed cache line entries. Accordingly, the invention allocates at least certain portions of each stack memory region (e.g., subregions 46, 48 and 50) to overlay memory 23 (see FIG. 1). By inserting the respective base pointers of the subregions (and the associated length values which define, respectively, the subregion extents) into overlay memory controller 24, addresses issued by CPU 12 onto bus 14 which fall within a subregion, are immediately recognized by overlay memory controller 24.

Thus, when CPU 12, during the execution of program 26, issues either a read or write instruction to an address value that is within the range of addresses contained in a stack subregion in overlay memory 23, overlay memory controller 24 responds to that read/write request and causes an inhibition of transmission of the read/write request to both cache controller 32 and main memory bus 20. Thus, neither wait states nor resynchronization actions are required.

When CPU 12 inserts an address onto high speed bus 14, as indicated previously, if the address is within the span of stack addresses assigned to overlay memory 23, overlay memory controller 24 responds and enables a return of a message to CPU 12 including the requested data or indicating that a requested write action has been performed. Further, when CPU 12 places an address on high speed bus 14, cache controller 32 also captures the request. If overlay memory 23 fulfills the request, cache controller 32 is inhibited from responding to the request (as a result of monitoring high speed bus 14 and noting a fulfillment of the data access request). However, if overlay memory controller 24 does not fulfil the request, cache controller 32 performs the necessary actions to fulfil the request, which may include an acquisition of data from main memory 16 via memory bus controller 22 and memory bus 20.

It is also to be understood that further portions of stack memory regions 40, 42, and 44 can be managed by cache memory 30. However, it is clear that the most highly used regions of the stack memory region should be assigned to overlay memory 23 so as to provide the most efficient system operation. Since overlay memory 23 handles data from the most used regions of the stack, cache memory 30 is able to operate in a more effective manner since it deals with data resident in lesser used areas of the stack and main memory.

Accordingly, when CPU 12 issues a read/write request, (i) if the address is within the range(s) held by overlay memory 23, it is responded to solely by overlay memory 23; (ii) if it is within the range of addresses held in cache memory 30, it is responded to by cache memory 30, which, if necessary, then performs main memory update actions. Otherwise, it is acquired from main memory 16 in the known manner.

This invention thus provides a flexible means to include an additional element in the memory hierarchy which can filter out high access areas of the main memory and cache memory, thereby increasing performance. The system designer can be very conservative with the amount of high speed overlay memory required, since the main memory will automatically fulfil all requests that occur outside of the overlay memory. Additionally, the reduction in turmoil associated with cache management of this high access area frees up an appreciable amount of system resources, thereby increasing the performance capabilities of the system.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Processing apparatus comprising the combination of:
   a) main memory means having a span of addresses;
   b) cache memory means;
   c) overlay memory means for providing high speed access to data values stored therein, said overlay memory means having an overlay span of addresses that falls within said span of addresses assigned to said main memory means, said overlay span of addresses remaining unchanged during execution of a program;
   d) processor means for operating a program to request access to data within said overlay span of addresses; and
   e) overlay controller means for responding to said request by accessing data from within said overlay memory means; and
   f) means for inhibiting transmission of any said request to said main memory means during an entire time of said execution of said program when said span of addresses is assigned to said overlay memory means, wherein data written to said overlay memory means is not written to said cache memory means.

2. The processing apparatus as recited in claim 1, wherein said means for inhibiting, upon receiving an address involved in a memory access, does not transmit said address to said main memory means if said overlay memory responds to said memory access.

3. The processing apparatus as recited in claim 1, wherein said processor means assigns to said overlay memory means plural address spans for storage of temporary variables and each of said address spans is indicated by a base pointer address and length value stored in said overlay controller means.

4. The processing apparatus as recited in claim 3, wherein said processor means includes program means for altering said plural address spans assigned to said overlay memory means, by revision of one or more base pointer addresses and length values in said overlay controller means.

5. The processing apparatus as recited in claim 1, wherein said cache memory means responds to a request for data from said processor means that does not fall within said overlay span of addresses.

6. The processing apparatus as recited in claim 5, wherein the cache memory means, upon detecting a request for access to data within the overlay span of addresses, is inhibited from accessing said data from said main memory means if said overlay memory means responds to said request for access.

7. A method for improving memory performance in a processor, said processor including at least main memory, a cache memory and an overlay memory, said overlay memory providing said processor with high speed access to data stored therein, said method comprising the steps of:
   a) allocating to said overlay memory a span of addresses within said main memory, and maintaining unchanged allocation of said span of addresses to said overlay memory during execution of a program;
   b) responding to access by a program of data from said span of addresses by (i) enabling said overlay memory to respond to said access, and (ii) invariably inhibiting transmission of an address in said span of addresses to said main memory during an entire time of said execution of said program when said span of addresses is assigned to said overlay memory, wherein data written to said overlay memory is not written to said cache memory.

8. The method as recited in claim 7, wherein step a) allocates addresses within said overlay memory by assigning a base address pointer and length value to said overlay memory.

9. The method as recited in claim 8, wherein step a) allocates said base address pointer through use of a software instruction, and also enables a re-allocation of said base address pointer by issuance of a new software instruction.

* * * * *